United States Patent [19]

Wygal et al.

[11] 4,194,588
[45] Mar. 25, 1980

[54] MOTOR VEHICLE FIRE PREVENTION DEVICE

[76] Inventors: John F. Wygal; Geraldine Schandoney; Dorothy L. Straus, all of 5893 Los Molinos, Buena Park, Calif. 90620

[21] Appl. No.: 942,538

[22] Filed: Sep. 15, 1978

[51] Int. Cl.² ............................................ B60R 21/00
[52] U.S. Cl. .............................. 180/279; 200/61.08; 340/52 H
[58] Field of Search ........ 180/96, 91, 103 A, 103 BF; 280/735; 307/10 R; 200/61.08, 61.19, 61.44; 340/52 H, 53

[56] References Cited

U.S. PATENT DOCUMENTS

| | | | |
|---|---|---|---|
| 2,939,925 | 6/1960 | Cole | 200/61.41 |
| 3,052,772 | 9/1962 | Koenig | 200/61.08 |
| 3,295,101 | 12/1966 | Ellis | 180/103 A |
| 3,410,359 | 11/1968 | Mollison | 180/103 A |
| 3,495,675 | 2/1970 | Hass | 180/91 |
| 3,842,222 | 10/1974 | Hogland | 180/91 |
| 3,853,199 | 12/1974 | Hirashima et al. | 200/61.08 |

*Primary Examiner*—David M. Mitchell
*Attorney, Agent, or Firm*—Robert D. Farkas

[57] ABSTRACT

A fire prevention device for motor vehicles, having internal combustion engines, including a hollow cylinder containing two electrically conducting expansible coils separated by a shatterable sheet of material, electrical leads from the two coils one to ground and the other to the electrical line leading to the vehicles ignition system, and means for fastening the cylinder adjacent to vehicle fuel tank. Upon impact, the coils short out the ignition circuit causing the vehicle engine to cease operating, thereby diminishing the risk of post impact fires.

8 Claims, 4 Drawing Figures

MOTOR VEHICLE FIRE PREVENTION DEVICE

BACKGROUND OF THE INVENTION

1. The Field of the Invention

This invention relates to devices for automatically shutting off the internal combustion engine of a motor vehicle after the vehicle has been in a collision of sufficient force to rupture the fuel tank.

2. DESCRIPTION OF THE PRIOR ART

The prior art abounds with various types of fire prevention devices for automobiles having internal combustion engines having been heretofore designed, but most of these previously disclosed fire prevention devices have been of the type whereby they are difficult to mount on the automobile and are overly complicated in design. Examples of these previously patented fire prevention devices are disclosed in U.S. Pat. Nos. 3,743,849 to Twata and 3,842,222 to Hogland.

SUMMARY OF THE INVENTION

A primary object of the present invention is to provide a fire prevention device which effectively and positively disables the internal combustion engine of a gasoline powered vehicle when the vehicle is involved in a collision of sufficient force to rupture the gas tank.

Another object of the present invention is to provide a fire prevention device constructed in a manner such that it may be readily attached to most conventional forms of automobiles powered by internal combustion engines.

Still another object of the present invention is to provide a fire prevention device constructed in a manner whereby the device will provide maintainence free yet reliable service when such service is imperative for saving property and/or lives.

A fire prevention device, for automobiles having internal combustion engines, includes an elongated hollow cylinder containing two electrically conducting expansible coils of wire separated by a shatterable sheet of material, electrical leads from the two coils, one to ground and the other to the electrical line leading to the automobile's ignition system, and means for affixing the device adjacent to the vehicle's fuel tank.

These objects, as well as further objects and advantages of the present invention will become readily apparent after reading the description of a non-limiting illustrative embodiment and the accompanying drawing.

DESCRIPTION OF THE PREFERRED EMBODIMENT

Figure 1:
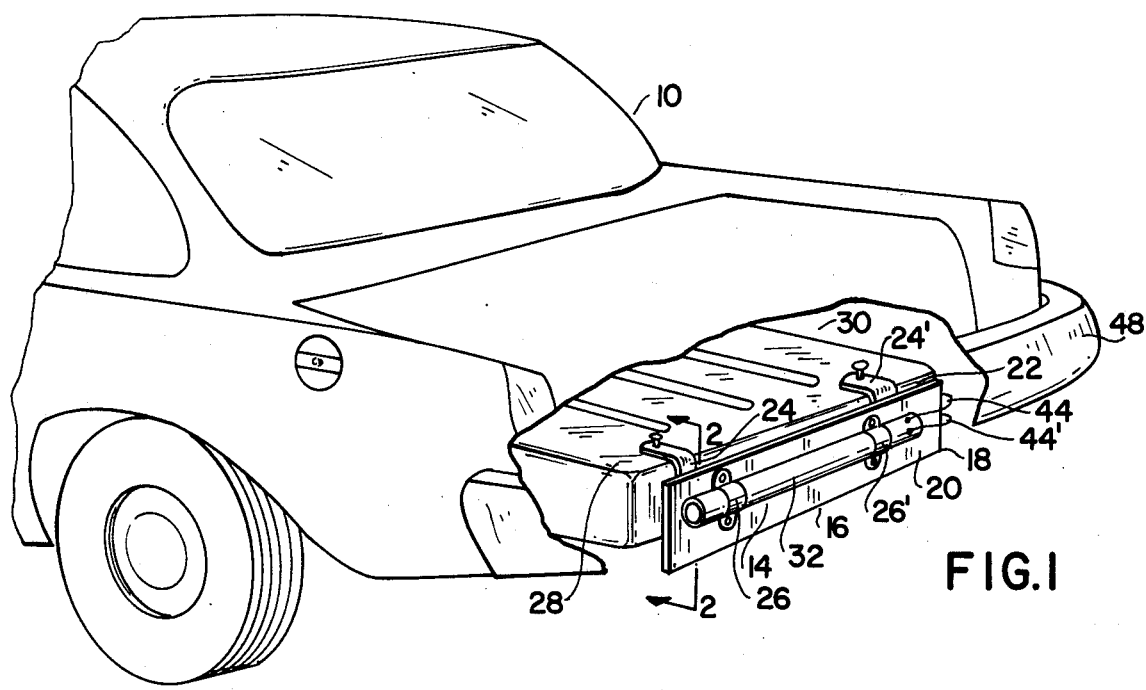
FIG. 1 is a fragmentary perspective view of the rear portion of an automobile and gas tank with the present invention operatively associated with the rear end of the gas tank.
Figure 2:
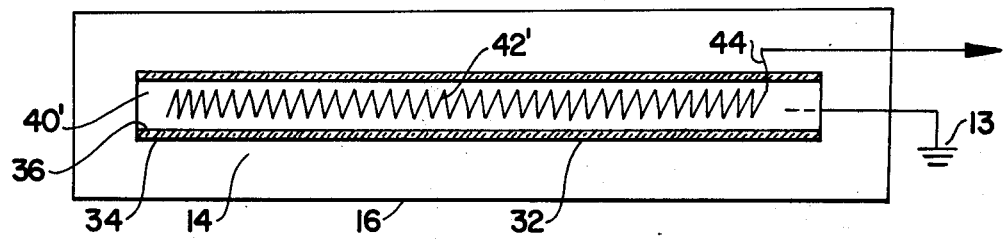
FIG. 2 is a front view of a portion of the present invention.
Figure 3:
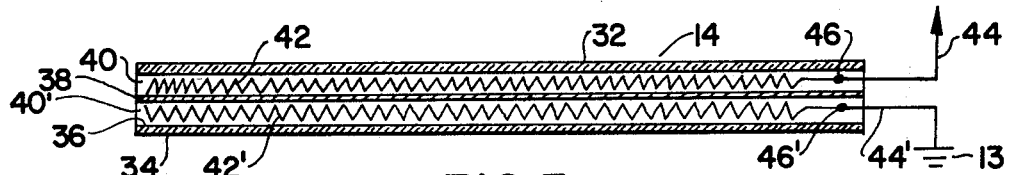
FIG. 3 is a plan view of a portion of the present invention isolated from its mountings.
Figure 4:
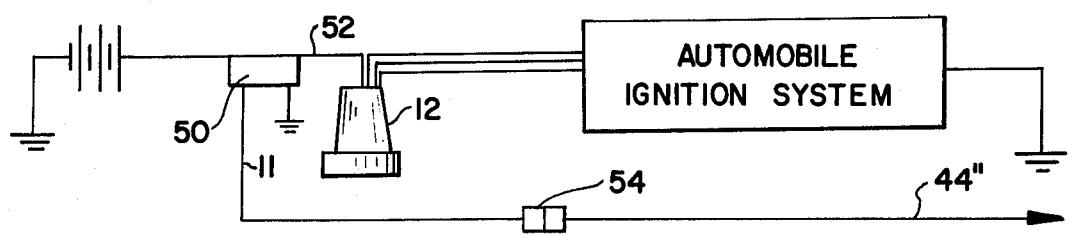
FIG. 4 is a schematic diagram to illustrate the electrical interconnections of the present invention to portions of a motor vehicle's electric components.

Referring now more specifically to the drawings, the reference numeral 10 generally designates a conventional form of automobile powered by an internal combustion engine, not shown, wherein the spark plugs thereat receives firing voltage through a conventional form of rotary distributor 12.

The present invention is equally applicable to motor vehicles having electronic ignition devices.

The present invention includes a clamp type mounting bracket 16.

The mounting bracket 16 comprises, in the preferred embodiment, a rectangular sheet 18 of wood, such as plywood, having a front face 20 and rear face 22. Two "C" shaped clamps 24 and 24' are affixed to the rear face 22. Two "U" shaped retention strips 26 and 26' are affixed to the front face 20. The two "C" shaped clamp elements 24 and 24' are vertically disposed on the rear face 22 of sheet 18 in a manner adapted to releasably engage the rear surface 28 of a conventional form of gas tank 30.

The fire prevention device 14 comprises a thin walled, elongated cylinder 32, preferably constructed of glass or deformable plastic, having outer surface 34 and inner surface 36. An elongated, rectangular sheet of glass 38 is inserted into cylinder 32 effectively dividing the interior into two electrically isolated chambers 40 and 40'. Two elongated bare coils 42 and 42' of electrically conductive wire are inserted into cylinder 32, one in each of the aforementioned chambers 40 and 40'. One end 44 of wire 42 leads out of chamber 40 through hole 46 in cylinder 32, similarly one end 44' of wire 42' leads out of chamber 40' through a hole 46' in cylinder 32.

Wire 44 may be electrically connected to wire 44", which is connected, at point 11 to high voltage coil 50. Coil 50 provides ignition voltage to distributor 12, by way of wire 52. Wire end 44' is electrically connected to any convenient ground 13.

In operation the fire prevention device 14 and mounting bracket 16 are horizontally disposed along gas tank 30 and fastened into position by clamp elements 24 and 24', as depicted in FIG. 1. Wire end 44" is electrically connected to coil 50 feeding the distributors 12 input line 32 and wire end 44' is electrically connected to ground.

When automobile 10 is struck from the rear, with enough force to cause bumper 48 to deform a sufficient amount and to cause gas tank 30 to rupture, cylinder 32 is crushed shattering glass plate 38, thus urging coils 42 and 42' into electrical contact with each other. Upon coil 42 contacting coil 42', the electrical input 11 to distributor 12 is short circuited to ground 13 thereby disabling the automobile's engine and significantly reducing the risks of gasoline igniting from contact with a hot exhaust manifold or similar risk associated with gasoline fumes in the area of a running internal combustion engine.

Plug and receptacle 54 are installed in wire 44" to be grounded to electric ground 13 and thereby disabling the engine of vehicle 10. The plug may be manually electrically disconnected from the receptacle, thereby enabling the engine of vehicle 10 to be electrically operative.

A primary object of the present invention is to provide a fire prevention device which effectively and positively disables the internal combustion engine of a gasoline powered vehicle when the vehicle is involved in a collision of sufficient force to possibly rupture the gas tank.

A further advantage is to provide a fire prevention device constructed in a manner such that it may be readily attached to most conventional forms of automobiles powered by internal combustion engines.

Still another advantage of the present invention is to provide a fire prevention device constructed in a manner whereby the device will provide maintainence free yet reliable service when such service is imperative for saving property and/or lives.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which as exclusive privilege or property is claimed are defined as follows:

1. A fire prevention device for motor vehicles having an ignition system, a fuel tank, said ignition system including an electrical ground and conductors carrying potential other than ground potential, comprising a hollow cylinder, means for affixing said cylinder adjacent a fuel tank of said motor vehicle, a pair of coil-like conductors, a sheet of shatterable material, said sheet of shatterable material carried within said cylinder, said pair of coil-like conductors carried within said cylinder having said sheet of shatterable material disposed there inbetween, means to electrically connect one of said coil-like conductors to said electrical ground and the other of said coil-like materials to said conductor of said ignition system having a potential other than at said electrical ground whereby said sheet of shatterable material when broken upon impact to said motor vehicle permits said pair of coil-like conductors to electrically engage one another shorting out said ignition system disabling said motor vehicle from further operation.

2. The apparatus as claimed in claim 1 wherein said cylinder is formed from a plastic material.

3. The apparatus as claimed in claim 1 wherein said cylinder is secured to said motor vehicle fuel tank.

4. The apparatus as claimed in claim 1 wherein said shatterable material comprises glass.

5. The apparatus as claimed in claim 1 wherein said conductor having a potential other than at said electrical ground, is electrically coupled to the spark coil of said motor vehicle.

6. The apparatus as claimed in claim 1 wherein said cylinder is disposed in a horizontal direction intermediate a rear bumper and said gas tank of said motor vehicle.

7. The apparatus as claimed in claim 1 further comprising a wood-like plate, means to secure said wood-like plate to said motor vehicle, said cylinder being secured to said wood-like plate.

8. The apparatus as claimed in claim 1 further comprising a plug, a socket, said plug being electrically coupled to said conductor having a potential other than at said electrical ground and said socket being electrically coupled to said other coil-like conductor.

* * * * *